(12) United States Patent  
Tengler et al.

(10) Patent No.: US 7,554,435 B2  
(45) Date of Patent: Jun. 30, 2009

(54) VEHICLE ON-BOARD UNIT

(75) Inventors: Steve Tengler, Grosse Pointe Park, MI (US); Jack Auflick, Westland, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 329 days.

(21) Appl. No.: 11/516,789

(22) Filed: Sep. 7, 2006

(65) Prior Publication Data

US 2008/0122652 A1 May 29, 2008

(51) Int. Cl.
*B60Q 1/00* (2006.01)

(52) U.S. Cl. .............. 340/436; 340/425.5; 340/426.16; 340/435; 340/454; 340/467; 340/471; 340/479; 340/903

(58) Field of Classification Search ......... 340/901–904, 340/463–472, 479, 425.5, 426.16, 435–436, 340/464, 467, 471, 903
See application file for complete search history.

(56) References Cited

U.S. PATENT DOCUMENTS

| | | | | | |
|---|---|---|---|---|---|
| 3,638,181 | A | * | 1/1972 | Bryant | 340/467 |
| 4,959,634 | A | * | 9/1990 | Miller | 340/467 |
| 5,023,599 | A | * | 6/1991 | Mitchell et al. | 340/467 |
| 5,289,182 | A | * | 2/1994 | Brillard et al. | 340/902 |
| 5,357,438 | A | * | 10/1994 | Davidian | 701/301 |
| 6,278,360 | B1 | * | 8/2001 | Yanagi | 340/436 |
| 6,388,580 | B1 | * | 5/2002 | Graham | 340/903 |
| 6,437,688 | B1 | * | 8/2002 | Kobayashi | 340/435 |
| 6,486,775 | B1 | * | 11/2002 | Lo | 340/467 |
| 7,077,549 | B1 | * | 7/2006 | Corliss | 362/499 |
| 7,098,781 | B2 | * | 8/2006 | Wu | 340/479 |
| 2002/0105423 | A1 | | 8/2002 | Rast | |
| 2003/0201885 | A1 | * | 10/2003 | Currie | 340/468 |
| 2004/0167717 | A1 | * | 8/2004 | Buchanan et al. | 701/301 |
| 2004/0245853 | A1 | * | 12/2004 | Odagawa et al. | 303/191 |

FOREIGN PATENT DOCUMENTS

JP 2006-039806 * 2/2006

* cited by examiner

*Primary Examiner*—Daniel Wu
*Assistant Examiner*—Son M Tang
(74) *Attorney, Agent, or Firm*—Global IP Counselors, LLP

(57) ABSTRACT

A vehicle on-board unit of a host vehicle is configured to communicate with other vehicle to alert the driver of a potential braking situation in a preceding vehicle. The vehicle on-board unit has an incoming message receiving section, an incoming message relevancy section and a driver warning section. The incoming message receiving section receives a preceding vehicle message containing throttle release data of a preceding vehicle located in front of the host vehicle. The incoming message relevancy section performs a relevancy determination of the throttle release data received. The driver warning section selectively alerts a driver of the host vehicle of a potential braking situation of the preceding vehicle based upon the relevancy determination.

19 Claims, 5 Drawing Sheets

VEHICLE ON-BOARD UNIT

BACKGROUND OF THE INVENTION

1. Field of the Invention

The present invention generally relates to a vehicle on-board unit. More specifically, the present invention relates to a host vehicle having a vehicle on-board unit that selectively warns a driver of the host vehicle of a potential braking situation of the preceding vehicle based upon a relevancy determination of throttle release data received from a preceding vehicle located in front of a host vehicle.

2. Background Information

Recently, vehicles are being equipped with a variety of informational systems such as navigation systems, Sirius and XM satellite radio systems, two-way satellite services, built-in cell phones, DVD players and the like. These systems are sometimes interconnected for increased functionality. Various informational systems have been proposed that use wireless communications between vehicles and between infrastructures, such as roadside units. These wireless communications have a wide range of applications ranging from crash avoidance to entertainment systems. The type of wireless communications to be used depends on the particular application. Some examples of wireless technologies that are currently available include digital cellular systems, Bluetooth systems, wireless LAN systems and dedicated short range communications (DSRC) systems.

Dedicated short range communications (DSRC) is an emerging technology that has been recently investigated for suitability in vehicles for a wide range of applications. DSRC technology will allow vehicles to communicate directly with other vehicles and with roadside units to exchange a wide range of information. In the United States, DSRC technology will use a high frequency radio transmission (5.9 GHz) that offers the potential to effectively support wireless data communications between vehicles, and between vehicles, roadside units and other infrastructure. The important feature of DSRC technology is that the latency time between communications is very low compared to most other technologies that are currently available. Another important feature of DSRC technology is the capability of conducting both point-to-point wireless communications and broadcast wireless messages in a limited broadcast area.

Accordingly, wireless technology can be used to provide various information from vehicle-to/from-infrastructure, and from vehicle-to-vehicle, such as providing GPS location, vehicle speed and other vehicle Parameter Identifiers (PIDs) including engine speed, engine run time, engine coolant temperature, barometric pressure, etc. When communications are established with between vehicles and/or roadside units in close proximity, this information would be communicated to provide a complete understanding of the vehicles in the broadcast area. This information then can be used by the vehicles for both vehicle safety applications and non-safety applications.

Recently, a Vehicle Safety Communication Consortium (VSCC) was established to study safety applications of wireless communications. The Vehicle Safety Communication Consortium developed a list of safety applications that were believed to have the highest potential for reducing the number or mitigating crashes. During these studies, one particular application that was developed was called the Emergency Electronic Brake Light application (EEBL). In the Emergency Electronic Brake Light application (EEBL), a vehicle-to-vehicle communication is established with an aim to prevent rear end crashes by communicating a hard braking event by a preceding vehicle to other vehicles in the vicinity. In this application, a vehicle can be notified of the hard braking event even if the driver cannot see the brake lights of the preceding vehicle, e.g. when a truck or a terrain obstacle is blocking the driver's view of the brake lights of the preceding vehicle. However, the so called the Emergency Electronic Brake Light application only provides information to following vehicles after the brakes have been applied. Thus, the following driver is not alerted of a potential braking situation occurring in the preceding vehicle. It has been discovered that just a few seconds can make a significant difference in whether an accident can be minimized. A discussion of the need for an advance brake warning system is discussed by David Shinar in his article, entitled: Fleet Study Evaluation of an Advance Brake Warning System. In this article the advance brake warning system activates the brake lights in response to rapid disengagement of a gas pedal to provide a following vehicle with advance warning of the host vehicle's potential braking system. However, if the brake lights of the host vehicle are blocked from the view of the following vehicle, then the following vehicle will not receive any advance warning.

In view of the above, it will be apparent to those skilled in the art from this disclosure that there exists a need for an improved vehicle on-board unit. This invention addresses this need in the art as well as other needs, which will become apparent to those skilled in the art from this disclosure.

SUMMARY OF THE INVENTION

One object of the present invention is to provide a vehicle on-board unit that provides a driver of the vehicle with a warning of a potential braking situation in a preceding vehicle located in front of the host vehicle equipped with the vehicle on-board unit even when the brake lights of the host vehicle are blocked from the view of the following vehicle.

The present invention was conceived in view of the above mentioned developments in vehicles and wireless communications. In view of the above, a vehicle on-board unit in accordance with one aspect of the present invention was developed in order to achieve the above mentioned object and other objects of the present invention. The vehicle on-board unit of this aspect of the present invention basically comprises an incoming message receiving section, an incoming message relevancy section and a driver warning section. The incoming message receiving section is configured to receive a preceding vehicle message containing throttle release data of a preceding vehicle located in front of a host vehicle equipped with the vehicle on-board unit. The incoming message relevancy section is configured to perform a relevancy determination of the throttle release data received by the incoming message receiving section. The driver warning section is configured to selectively alert a driver of the host vehicle of a potential braking situation of the preceding vehicle based upon the relevancy determination of the incoming message relevancy section.

In accordance with another aspect of the present invention, a method for early warning to a host vehicle driver of potential braking situation of a preceding vehicle is provided that basically comprises: receiving a preceding vehicle message containing throttle release data of the preceding vehicle located in front of a host vehicle; performing a relevancy determination of the throttle release data that was received by the host vehicle; and selectively warning the driver of the host vehicle of a potential braking situation of the preceding vehicle based upon the relevancy determination of the throttle release data.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
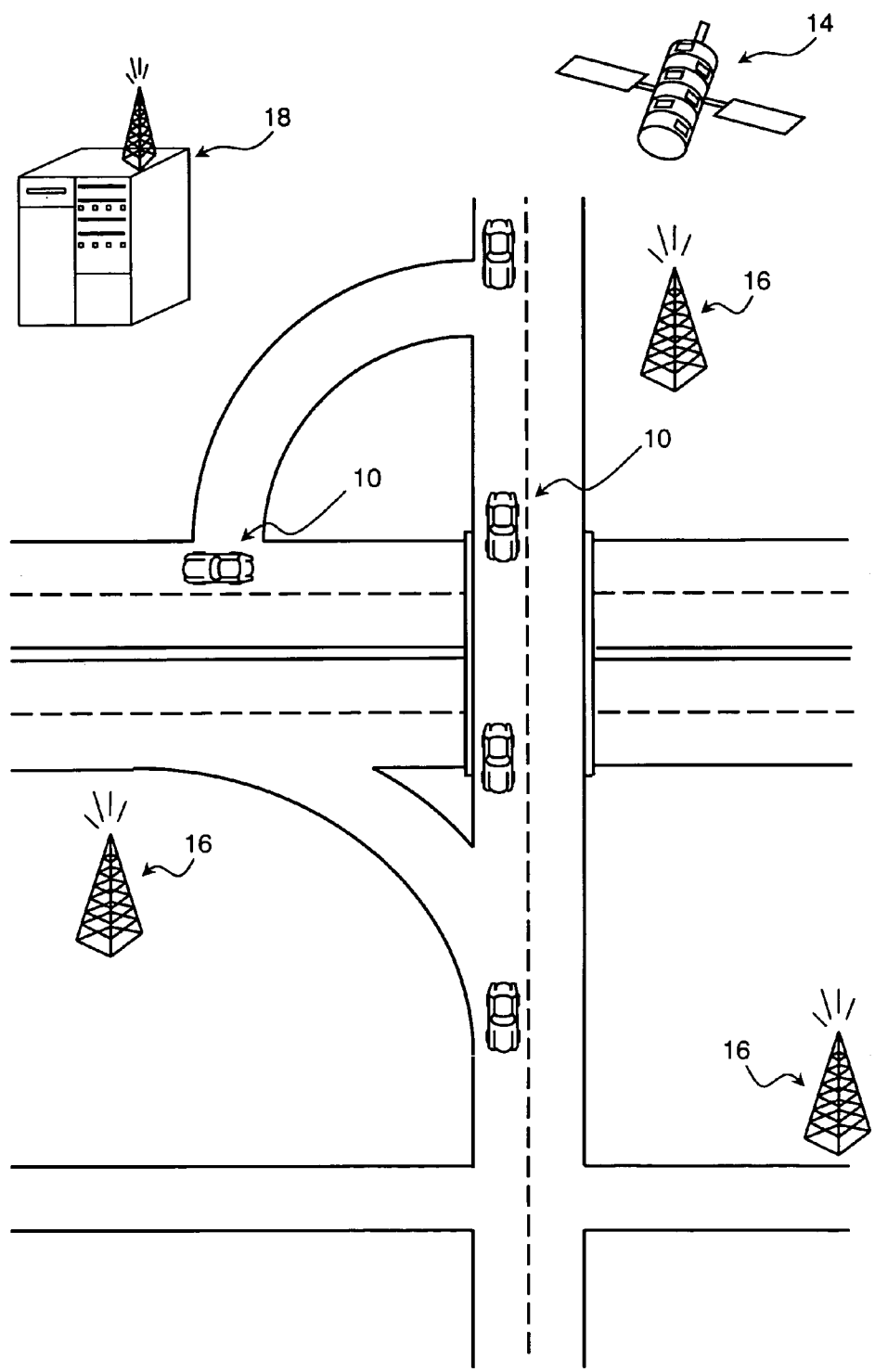
FIG. 1 is a pictorial representation of a two-way wireless communications network showing several vehicles equipped with an on-board unit capable of conducting two-way wireless communications with each other and as well as an external server via a plurality of roadside units in a vehicle infrastructure system in accordance with the present invention.
Figure 2:
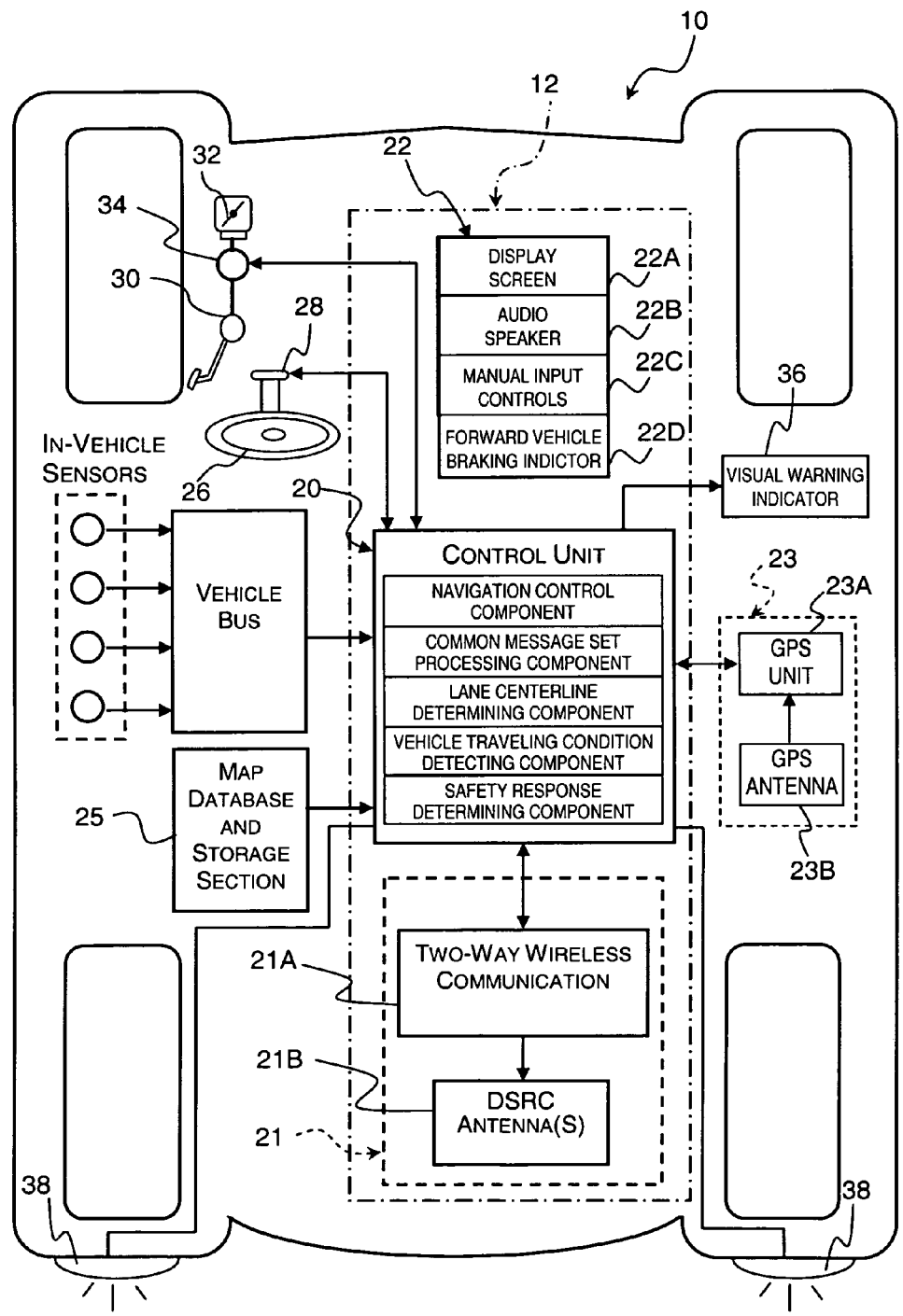
FIG. 2 is a schematic representation of a vehicle that is equipped with the on-board unit for conducting two-way wireless communications in the vehicle infrastructure system in accordance with the present invention.
Figure 3:
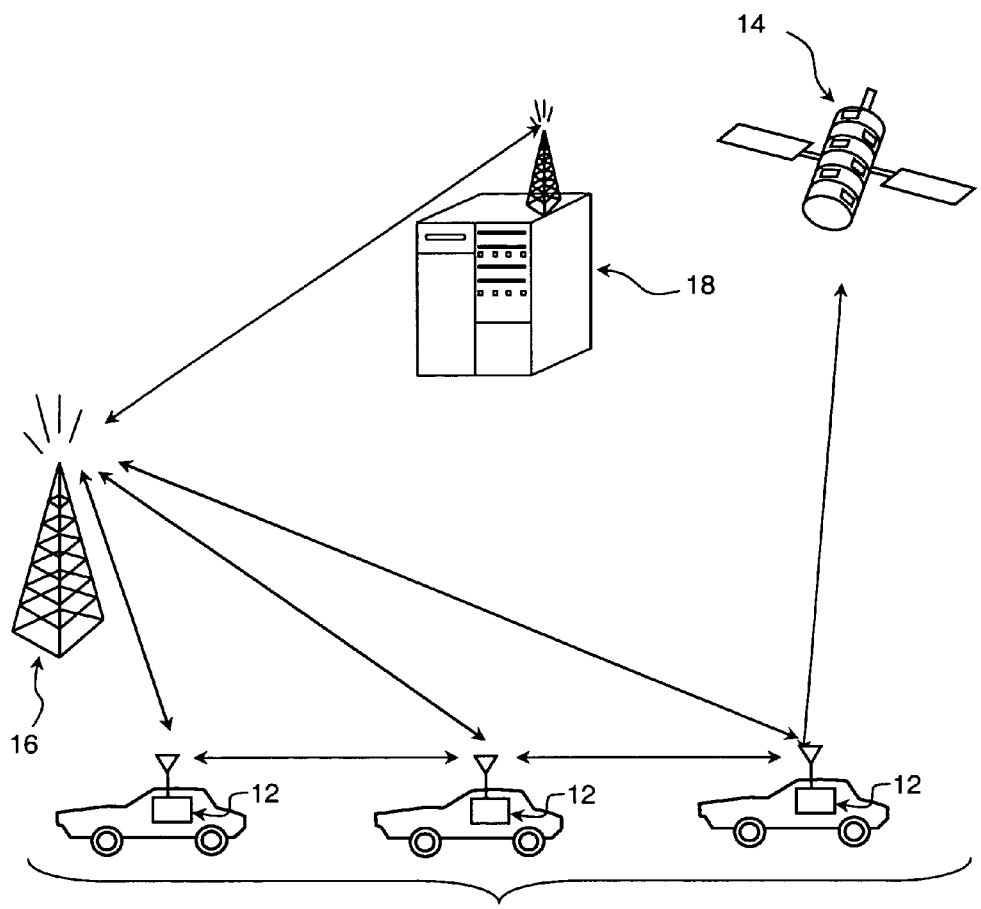
FIG. 3 is a pictorial representation of the two-way wireless communications network showing the various communications in the vehicle infrastructure system in accordance with the present invention.

Referring initially to FIGS. 1 to 3, a two-way wireless communications network is illustrated that forms a part of a vehicle infrastructure system in accordance with one embodiment of the present invention. In this vehicle infrastructure system, a plurality of host vehicles 10 are each equipped with a vehicle on-board unit 12 in accordance with one embodiment of the present invention. The two-way wireless communications network also preferably includes one or more global positioning satellites 14 (only one shown), and one or more roadside units 16 and a base station or external server 18. As explained below, the vehicle on-board unit 12 is configured and arranged to execute safety programs including a lane centerline determination feature, an anti-tailgating feature and a potential braking alert feature in accordance with the present invention. By accurately determining a lane centerline of the lane that a vehicle is traveling, the vehicle on-board unit 12 can more accurately determine the relevancy of an incoming message for selectively performing the anti-tailgating feature and a potential braking alert feature.

In this system, the term "host vehicle" refers to a vehicle among a group of vehicles equipped with two-way wireless communications in which a vehicle to vehicle communications are carried out in accordance with the present invention. The term "preceding vehicle" refers to vehicles equipped with two-way wireless communications that are located in front of the host vehicle and traveling on the same road as the host vehicle. The term "following vehicle" refers to vehicles equipped with two-way wireless communications that are located in behind the host vehicle and traveling on the same road as the host vehicle. The term "neighboring vehicle" refers to vehicles equipped with two -way wireless communications that are located within a prescribed communication (broadcasting/receiving) area surrounding the host vehicle in which the host vehicle is capable of either broadcasting a signal to another vehicle within a certain range and/or receiving a signal from another vehicle within a certain range.

Referring now to FIG. 2, the vehicle on-board unit 12 of the present invention basically includes a controller or control unit 20, a two-way wireless communication system 21 and a human-machine interface section 22. In the present invention, the control unit 20 and the human-machine interface section 22 cooperate together to constitute both a user inputting section and a reporting section. Also in the present invention, the control unit 20 and the two-way wireless communication system 21 cooperate together to constitute a vehicle to vehicle communication section.

The two-way wireless communication system 21 is configured and arranged such that the control unit 20 receives and/or sends various signals to other DSRC equipped component and systems in the communication (broadcasting/receiving) area that surrounds the host vehicle 10. The human-machine interface section 22 includes a screen display 22A, an audio speaker 22B and a plurality of manual input controls 22C that are operatively coupled to the control unit 20. The control unit 20 is also preferably coupled to a global positioning system 23 (constituting a navigation unit) having a GPS unit 23A and a GPS antenna 23B. A map database and storage section 25 is also preferably provided that contains various data used by the control unit 20 to carry out the navigation controls as well as implementation of various safety measures. The map database and storage section 25 can be manual updated through removable media (CD-ROM or DVD) or automatically updated via periodic communications with the external server 18. The control unit 20, the human-machine interface section 22, the global positioning system 23 and the map database and storage section 25 are operatively connected together to perform the various navigation functions, and thus, constitute an on-board navigation unit. Moreover, the control unit 20 of the vehicle on-board unit 12 is configured to receive detection signals from various in-vehicle sensors including, but not limited to, an ignition switch sensor, an accessory switch sensor, a vehicle speed sensor, an acceleration sensor, etc.

Still referring now to FIG. 2, the vehicle 10 is basically a conventional vehicle which has been modified to incorporate the vehicle on-board unit 12 of the present invention. Thus, the conventional parts of the vehicle 10 will not be discussed and/or illustrated herein. Rather, only those parts that interact with the vehicle on-board unit 12 will be discussed and/or illustrated herein as needed to understand the present invention. The vehicle 10 is provided with a steering structure 26, a steering vibrating device 28, an accelerator pedal 30 operatively connected to a throttle valve 32, a throttle valve opening sensor 34, a visual warning indicator 36 and a pair of brake lights 38 as well as other parts not shown. The steering vibrating device 28 is operatively controlled by the control unit 20 to vibrate the steering wheel of the steering structure 26 when the control unit 20 determines that it is desirable to warn the driver of a safety concern such as a potential braking situation occurring in the preceding vehicle. The throttle valve opening sensor 34 is operatively connected to the control unit 20 to indicate the movement of the accelerator pedal 30 and or the opening/closing of the throttle valve 32. The visual warning indicator 36 is operatively controlled by the control unit 20 to provide a visual warning to the driver when a signal is received indicating a safety concern such as a potential braking situation occurring in the preceding vehicle, e.g., the releasing the accelerator pedal in the preceding vehicle and/or the closing of the throttle valve of the preceding vehicle.

As explained in more detail below, the vehicle on-board unit 12 is configured and arranged to communicate with other vehicle and the roadside units 16 to send and receive vehicle parameters relating to safety issues including but not limited to, a path history with a center lane offset to increase the accuracy of a lane centerline determination of the road that the host vehicle is traveling, a current vehicle position to activate the anti-tailgating feature, and throttle information to activate the potential braking alert feature.

Still referring to FIG. 2, the control unit 20 is operatively connected to the two-way wireless communication system 21, the human-machine interface section 22, the global positioning system 23, the map database and storage section 25, the steering vibrating device 28, the throttle valve opening sensor 34, and the visual warning indicator 36. The control programs of the control unit 20 is programmed to include functions that can be generally divided into a navigation control component, a common message set processing component, a lane centerline determining component, a vehicle traveling condition detecting component and a safety response determining component. The navigation control component is configured to control the navigation functions of the navigation unit. The navigation functions are conventional, and thus, the navigation functions will not be discussed herein.

The common message set processing component is configured to the process the signals from the various vehicle sensors to produce the outgoing common message set, and to process the incoming common message sets from other vehicles 10 and/or roadside units 16. In particular, the two-way wireless communication system 21 is operatively connected to the common message set processing component to provide the incoming messages from neighboring vehicle to common message set processing component of the control unit 20. Thus, the common message set processing component basically includes a vehicle path history generating section, an incoming message receiving section, an incoming message relevancy section and a relevancy adjustment section. The vehicle path history generating section generates a host vehicle path history data indicative of a travel path of the host vehicle based on the signals from the global positioning system 23. The incoming message receiving section receives incoming common message sets at least containing vehicle path history data of neighboring (preceding and following) vehicles with statistical information and throttle release data of neighboring (preceding and following) vehicles from the two-way wireless communication system 21. The incoming message relevancy section is configured to perform a relevancy determination of the throttle release data received by the incoming message receiving section. The relevancy adjustment section is configured to adjust the relevancy determination of the throttle release data to selectively change when the driver of the host vehicle is alerted of the potential braking situation of the preceding vehicle based on the vehicle traveling condition determined by the vehicle traveling condition detecting component.

The lane centerline determining component is configured to process the data of the common message set processing component to more accurately determine the lane centerline of the lane that the host vehicle is traveling. In particular, the lane centerline determining component is configured to determine a lane centerline of the lane that the host vehicle is currently traveling based on the host vehicle path history data that is generated by the vehicle path history generating section, and the preceding vehicle path history data that is received by the incoming message receiving section and processed by the incoming message relevancy section and the relevancy adjustment section as explained below.

The vehicle traveling condition detecting component is configured to process the various signals relating to the current traveling condition of the host vehicle and/or neighboring vehicles. The vehicle traveling condition detecting component of the control unit 20 receives various signals from the vehicle sensors that indicate a current vehicle traveling condition of the host vehicle. Thus, the vehicle traveling condition detecting component of the control unit 20 function as a vehicle traveling condition detecting section that determines a current vehicle traveling condition of the host vehicle. When the control unit 20 is performing the anti-tailgating feature, the vehicle traveling condition detecting component of the control unit 20 more specifically function as a host vehicle safety zone detecting section that is configured to detect a vehicle traveling condition indicative of a potentially inadequate safety zone occurring in the host vehicle.

The safety response determining component is configured to activate the various warning devices and/or countermeasure devices upon detecting a potential safety concern to the host vehicle. Thus, the safety response determining component includes an automatic brake light triggering section, a brake light activating section and a driver warning section. The automatic brake light triggering section and the brake light activating section are used in connection with the anti-tailgating feature of the present invention, while the driver warning section is used in connection with the potential braking alert feature of the present invention. The driver warning section is configured to selectively alert a driver of the host vehicle of a potential braking situation of the preceding vehicle based upon the relevancy determination of the incoming message relevancy section. The safety response determining component of the control unit 20 performs the dual functions of an automatic brake light triggering section and a brake light activating section. The automatic brake light triggering section is configured to output a brake light activation signal upon determining a predetermined condition has been satisfied based upon the vehicle traveling condition detected by the vehicle traveling condition detecting section.

As seen in FIG. 3, the two-way wireless communications are conducted between the vehicles 10 as well as between the vehicles 10 and the roadside units 16. The external server 18 is configured and arranged to communicate with the vehicle on-board unit 12 to provide the off-board navigation service through wireless communications via the roadside units 16 within the two-way wireless communications network, if need and/or desired. In particular, the roadside units 16 (only two shown) relays signals between the vehicle on-board units 12 of the host vehicles 10 and the external server 18. Thus, the roadside units 16 are configured to send signals to the external server 18 and the vehicle on-board units 12 of the host vehicles 10, and receive signals from the vehicle on-board units 12 of the host vehicles 10 and the external server 18. While the two-way wireless communications network is illustrated as a dedicated short range communications (DSRC) network, it will be apparent to those skilled in the art from this disclosure that other types of two-way wireless communications networks can be used to carry out the present invention. For example, it will be apparent to those skilled in the art from this disclosure that two-way communications such as cellular, Wimax, Wifi, etc can be used as a two-way wireless communications network to carry out the present invention.

The global positioning satellite 14 is a conventional component that is known in the art. Since the global positioning satellite is known in the art, the structures of the global positioning satellite 14 will not be discussed or illustrated in detail herein. Rather, it will be apparent to those skilled in the art from this disclosure that the global positioning satellite 14 can be any type of structure that can be used to carry out the present invention.

The host vehicles 10 are preferably each equipped with a vehicle travel data collection unit so that information can be communicated between the vehicles 10 and the nearby roadside units 16 within the two-way wireless communications network. More specifically, each of the roadside units 16 is equipped with a DSRC unit or other suitable two-way wireless communication system for broadcasting and receiving signals to/from the host vehicles 10 located within a prescribed communication (broadcasting/receiving) region surrounding the roadside unit 16. Moreover, each roadside unit 16 is preferably an IP enabled infrastructure that is configured and arranged to establish a link between the vehicle on-board unit 12 of the host vehicle 10 and an external service provider, such as the external server 18. Specifically, in the present invention, the roadside unit 16 is configured and arranged to establish a link between the vehicle on-board units 12 of the host vehicles 10 and the external server 18. An example is shown in FIG. 3 in which the vehicle on-board unit 12 of the host vehicle 10 establishes a link to the external server 18 via the roadside unit 16 in close proximity to the host vehicle 10. The external server 18 is, for example, a telecommunications provider or a service provider such as the vehicle's manufacturer. Since roadside units are known in the art, the structures of the roadside units 16 will not be discussed or illustrated in detail herein. Rather, it will be apparent to those skilled in the art from this disclosure that the roadside unit can be any type of structure that can be used to carry out the present invention.

The control unit 20 preferably includes a microcomputer with a lane centerline determining program and vehicle safety response programs including an anti-tailgating program and a potential braking situation alert program. The lane centerline determining program is especially useful in assisting in the relevancy determination of incoming messages from other vehicles. Thus, determining an accurate lane centerline, the host vehicle can determine if a message from a following vehicle is relevant such that the anti-tailgating program activates the host vehicle brake lights 38 or a message from a preceding vehicle is relevant such that the potential braking situation alert program activates a warning signal to the driver of the potential braking situation.

Basically, in the lane centerline determining program discussed below, the accuracy of determining a centerline of lane is accomplished by cumulating path histories of vehicles and integrating this path history information to obtain a cumulative lane centerline for a lane of a road. In other words, the vehicle path histories are from several vehicles are used together to develop an accurate lane centerline. For example, a first vehicle broadcasts first vehicle path history data indicative of a travel path of the first vehicle that has traveled along a vehicle lane. Then, a second vehicle subsequently traveling the lane will receive the first vehicle path history data and broadcast cumulative vehicle path history data using its own (second) vehicle path history data and the first vehicle path history data to indicate the centerline of the lane. Next, a third vehicle subsequently traveling the lane will receive the cumulative vehicle path history data path history from the second vehicle, and will revise the position of centerline of the lane based on the third vehicle path history data and the cumulative vehicle path history data. This lane centerline data will be continuously transmitted to each subsequent vehicle to develop very accurate lane centerline data.

Basically, in the anti-tailgating program discussed below, the vehicle traveling condition detecting section of the control unit 20 is preferably configured to detect one or more factors that affect the appropriate following distance. Upon the vehicle traveling condition detecting section of the control unit 20 determining a predetermined condition has been satisfied based upon the vehicle traveling conditions that were detected, the automatic brake light triggering section of the control unit 20 outputs a brake light activation signal to the brake light activating section of the control unit 20. When the brake light activation signal from the automatic brake light triggering section of the control unit 20 is received by the brake light activating section of the control unit 20, then the brake light activating section of the control unit 20 activates the brake lights 38 so that that flash at the following vehicle. The brake lights 38 will continue to be flashed at the following vehicle until the potentially inadequate safety zone occurring in a host vehicle ceases to exist. The brake light activating section of the control unit 20 activates the brake lights 38 of the host vehicle without a braking operation being performed in the host vehicle upon receiving the brake light activation signal from automatic brake light triggering section of the control unit 20.

Basically, in the potential braking situation alert program discussed below, the incoming message receiving section of the control unit 20 receives a preceding vehicle message containing throttle release data of the preceding vehicle located in front of the host vehicle. Then, the incoming message relevancy section of the control unit 20 performs a relevancy determination of the throttle release data that was received by the host vehicle, and the driver warning section of the control unit 20 selectively alert the driver of the host vehicle of a potential braking situation of the preceding vehicle based upon the relevancy determination of the throttle release data.

The control unit 20 also preferably includes other conventional components such as an input interface circuit, an output interface circuit, and storage devices such as a ROM (Read Only Memory) device and a RAM (Random Access Memory) device. The memory circuit stores processing results and control programs such as ones for operation of the two-way wireless communication system 21, the human-machine interface section 22, the global positioning system 23, the map database and storage section 25, the steering vibrating device 28, the throttle valve opening sensor 34, and the visual warning indicator 36. The control unit 20 is capable of selectively controlling other DSRC components of the host vehicle 10 such as other safety systems as needed and/or desired. It will be apparent to those skilled in the art from this disclosure that the precise structure and algorithms for the control unit 20 can be any combination of hardware and software that will carry out the functions of the present invention.

The two-way wireless communication system 21 preferably includes communication interface circuitry that connects and exchanges information with other ones of the vehicles 10 that are similarly equipped as well as with the roadside units 16 through a wireless network within the broadcast range of the host vehicle 10. The two-way wireless communication system 21 is preferably configured and arranged to conduct direct two-way communications between vehicles (vehicle-to-vehicle communications) and roadside units (roadside-to-vehicle communications). Moreover, the two-way wireless communication system 21 is preferably configured to periodically broadcast a signal with the so called common message set in the broadcast area. The so called common message set can be broadcasted in three different way, i.e., (1) event based broadcasting, (2) periodic broadcasting and (3) hybrid (event based/periodic) broadcasting. Preferably, periodic broadcasting or hybrid (event based/periodic) broadcasting is used to carry out the present invention. Thus, the two-way wireless communication system 21 acts as a two-way wireless communications section that is configured to receive the incoming common message sets from neighboring (preceding and following) vehicles. In connection with the present invention, the incoming common message set at least includes vehicle path history data with statistical information, lane boundaries and throttle release data. Also, the two-way wireless communication system 21 is configured to broadcast the common message set of the host vehicle. The broadcasted common message set preferably at least includes the host vehicle path history data and the preceding vehicle path history data (i.e., cumulative vehicle path history). Preferably, the two-way wireless communications system 21 is further configured to broadcast a degree of uncertainty associated with the cumulative vehicle path history and the lane boundaries of the host vehicle as a part of the common message set for the host vehicle.

More specifically, as seen in FIG. 2, the two-way wireless communication system 21 is an on-board unit that includes a host vehicle two way communication device 21A and one or more antennas 21B. As mentioned above, the two-way wireless communication system 21 can be any suitable two-way wireless system, e.g., DSRC cellular, Wimax, Wifi, etc. The two way communication device 21A is configured to at least conduct direct short range communications in a host vehicle broadcast area surrounding the host vehicle 10 via the antennas 21B. Preferably, the antennas 21B include both an omnidirectional antenna and a multi-directional antenna. In one preferred embodiment, the two-way wireless communication system 21 is a dedicated short range communication (DSRC) system, since the latency time between communications is very low compared to most other technologies that are currently available. However, other two-way wireless communication systems can be used if they are capable of conducting both point-to-point wireless communications and broadcast wireless messages in a limited broadcast area so long as the latency time between communications is short enough to carry out the present invention. When the two-way wireless communication system 21 is a DSRC system, the two-way wireless communication system 21 will transmit at a 75 Mhz spectrum in a 5.9 GHz band with a data rate of 1 to 27 Mbps, and a maximum range of about 1,000 meters. Preferably, the two-way wireless communication system 21 includes seven (7) non-overlapping channels. The two-way wireless communication system 21 will be assigned a Medium Access Control (MAC) address and/or an IP address so that each vehicle in the network can be individually identified.

The global positioning system 23 is a conventional global positioning system (GPS) that is configured and arranged to receive global positioning information of the host vehicle 10 in a conventional manner. Basically, the GPS unit 23A is a receiver for receiving a signal from the global positioning satellite 14 (FIG. 1) via the GPS antenna 23B. The signal transmitted from the global positioning satellite 14 is received at regular intervals (e.g. one second) to detect the present position of the host vehicle 10. The GPS unit 23A preferably has an accuracy of indicting the actual vehicle position within a few meters or less. This data (present position of the host vehicle) is fed to the control unit 20 for processing. Moreover, the GPS data is also transmitted to the roadside units 16 through wireless communications for the off-board navigation processing.

The roadside units 16 are configured to obtain positions of the host vehicles 10 that are traveling along various routes. The two-way wireless communication system 21 of host vehicles 10 communicates with the roadside units 16 along the travel route. The roadside units 16 are positioned at various distances along different routes.

Basically, the increased accuracy in determining the centerline of lane is accomplished by cumulating path histories of vehicles and integrating this path history information to obtain a cumulative lane center for a lane of a road. More specifically, for example, the two-way wireless communication system 21 of each of the vehicles 10 periodically broadcasts a signal with a so called common message set in the broadcast area. This common message set includes a path history (i.e., breadcrumbs) that is formed by a plurality of GPS points. Thus, a preceding or lead vehicle (vehicle #1) broadcasts its path history, which is indicative of the centerline of the lane that it is traveling. A following vehicle (vehicle #2) receives the path history of the vehicle #1, and then calculates the centerline of the lane that it is traveling based on both its own path history and the path history of the vehicle #1. Then, another following vehicle (vehicle #3) receives the path history of the vehicle #2 and a cumulative lane center offset as well as other statistical information discussed below. The vehicle #3 now calculates the centerline of the lane that it is traveling based on both its own path history and the cumulative lane center offset broadcasted by the vehicle #2. The vehicle #3 will now broadcast its own path history and an amended cumulative lane center offset that is based on the path histories of vehicles #1, #2 and #3. In other words, the amended cumulative lane center offset broadcasted by the vehicle #3 includes slight adjusts the prior cumulative lane center offset broadcasted by the vehicle #2 based on its integrated information. Thus, the cumulative lane center offset becomes increasingly more accurate over time with each of the vehicles adding its own path history. Integration of the broadcasting vehicle's information could happen in a variety of manners. One potential method of integrating the path histories of vehicles to develop an accurate center of a lane can include the following embodiment.

The lead vehicle #1 communicates its path history (i.e., breadcrumbs) as a plurality of GPS points V1(1), V1(2), V1(3), V1(4), V1(5), V1(6), V1(7), V1(8), V1(9), V1(10), etc. Then, the following vehicle #2 integrates its path history (i.e., breadcrumbs) with the path history (i.e., breadcrumbs) of the lead vehicle #1 to obtain an offset value for each GPS point. For example, the following vehicle #2 has a path history (i.e., breadcrumbs) with the GPS points V2(1), V2(2), V2(3), V2(4), V2(5), V2(6), V2(7), V2(8), V2(9), V2(10), etc. and calculates lane offset values O3(1), O3(2), O3(3), O3(4), O3(5), O3(6), O3(7), O3(8), O3(9), O3(10), etc. The control unit 20 of the following vehicle #2 calculates the lane offset value O2(1) for GPS points V1(1) and V2(1) using, for example, the following equation: $O2(1)=\alpha(V1(1))+\beta(V2(1))$. Preferably, in this example, $\alpha$ equals a fractional constant value that heavily weights previously known information, while $\beta$ equals a fractional constant value that underweights the its own vehicle information. The other offset values are calculated in the same manner. Thus, the following vehicle #2 communicates its path history (i.e., breadcrumbs) with the GPS points V2(1), V2(2), V2(3), V2(4), V2(5), V2(6), V2(7), V2(8), V2(9), V2(10), etc. and the calculated center lane offset values O2(1), O2(2), O2(3), O2(4), O2(5), O2(6), O2(7), O2(8), O2(9), O2(10), etc. Now, when the subsequently following vehicle #3 receives the broadcast of the path history and the center lane offset from the following vehicle #2, the control unit 20 of the subsequently following vehicle #3 integrates its path history (i.e., breadcrumbs) with the path history (i.e., breadcrumbs) of the following vehicle #2 to obtain an amended offset value for each GPS point. In other words, the subsequently following vehicle #3 has a path history (i.e., breadcrumbs) with the GPS points V3(1), V3(2), V3(3), V3(4), V3(5), V3(6), V3(7), V3(8), V3(9), V3(10), etc. and calculates the amended lane offset values O3(1), O3(2), O3(3), O3(4), O3(5), O3(6), O3(7), O3(8), O3(9), O3(10), etc. The subsequently following vehicle #3 basically uses the same equation that was used by the following vehicle #2 to calculate the amended offset values, except now the offset values calculated by the following vehicle #2 are used instead of the GPS points of the lead vehicle #1. Namely, the subsequently following vehicle #3 calculates a lane offset value O3(1) for GPS point V3(1) using for example the following equation: $O3(1)=\alpha(O2(1))+\beta(V2(1))$. Preferably, $\alpha$ equals a fractional constant value that heavily weights previously known information, while $\beta$ equals a fractional constant value that underweights the its own vehicle information. The other offset values for the GPS points of subsequently following vehicle #3 are calculated in the same manner. Thus, the lane centerline determining component of the control unit 20 is configured to weight the preceding vehicle path history data more heavily than the host vehicle path history data in determining the centerline of the lane. In other words, the lane centerline determining component is further configured to increase a weight given to the preceding vehicle path history data in determining the centerline of the lane as the statistical information includes more vehicle path histories.

Preferably, the lane offset values that are broadcasted include statistical indictor that indicates the number of vehicle path histories included in the lane offset values as well as other statistical information including a mean value and a standard deviation for the lane offset values. This would permit the following vehicle to integrate the following vehicle information as one of a known number of vehicles instead of a blind integration. Moreover, this would provide more statistical information about lane positioning. Also, each of the vehicles could communicate its lane boundaries for the GPS points that had previously been communicated within the lane to thereby provide a virtual zone of relevance. Furthermore, each of the vehicles could communicate the uncertainty associated with the lane offset values for determining the cumulative centerline of the lane. For example, if the lane offset values are based upon a single vehicle with in accurate positioning information, the uncertainty may be very high. However, during accumulation of path histories, lane offset values might increase the degree of certainty and provide a degree of uncertainty indicator with the path history data to following vehicles. Thus, the determination of the centerline of the lane can be adjusted in subsequent or following vehicles using the statistical information relating to the preceding vehicle path histories and/or using lane boundary data for the GPS points, and/or using a degree of uncertainty indicator associated with the cumulative vehicle path history data.

Figure 5:
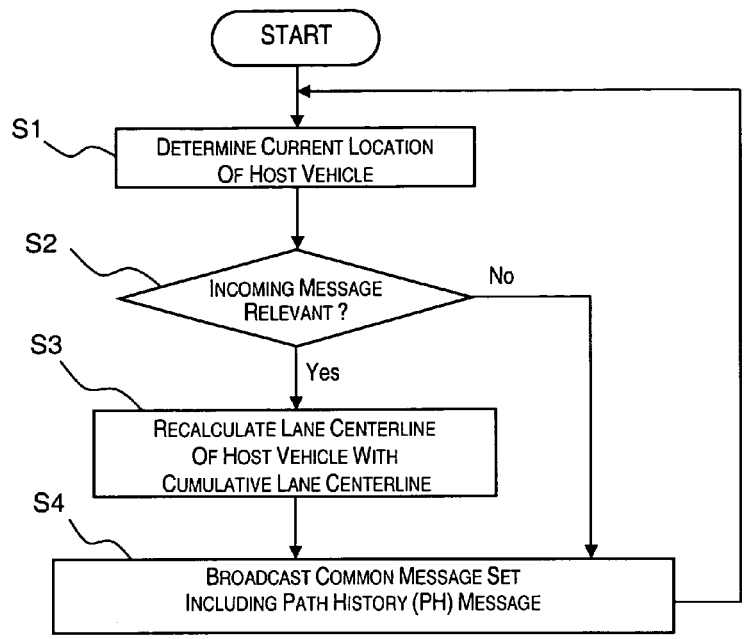
FIG. 5 is a flowchart illustrating a flow of control executed in the on-board unit in performing a lane centerline determination method in accordance with the present invention.

Referring now to a flowchart of FIG. 5, a simplified flow chart is illustrated to explain the basic functions that are performed in the vehicle on-board unit 12 when conducting the lane centerline determination in accordance with one embodiment of the present invention. Of course, it will be apparent to those skilled in the art from this disclosure that other options, can be provided to the user in addition to the ones described and illustrated in the embodiment being used to illustrate the basic functions of the present invention.

When the user first turns on the vehicle, the vehicle on-board unit 12 is activated. The control unit 20 then obtains the current location of the host vehicle 10 via the global positioning system 23 (step S1). The GPS data (current location) of the host vehicle is used by the vehicle path history generating section of the control unit 20 to generate a current host vehicle path history (PH) that comprises a plurality of GPS points which are diagrammatically illustrated in FIG. 6 as breadcrumbs. This host vehicle path history is associated with the map information to determine a lane centerline for the road that the host vehicle is traveling. In certain safety applications such as the potential braking alert feature of the present invention, it is desirable to accurately determine the lane of the preceding vehicle in which the potential braking situation may be occurring.

Figure 6:
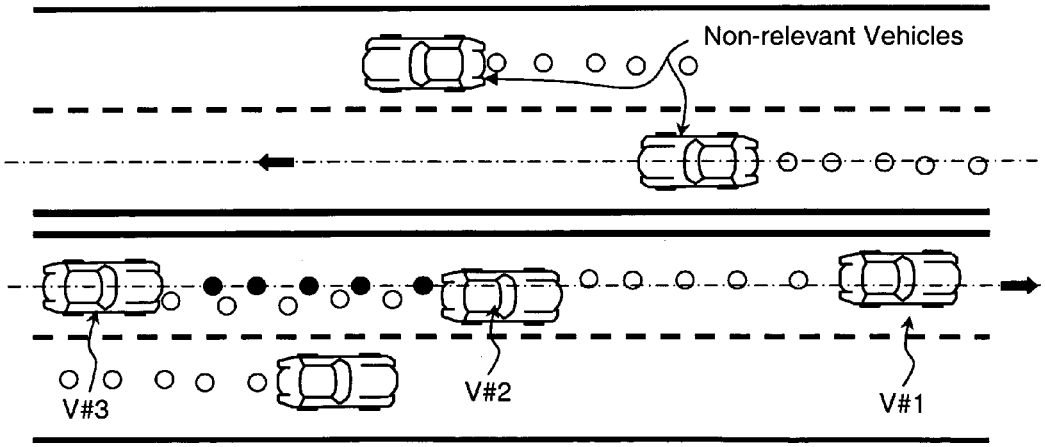
FIG. 6 is a pictorial representation of the breadcrumbs by several vehicles equipped with the on-board unit in accordance with the present invention.

Prior to receiving a relevant incoming, as discussed below, the control unit 20 initially generates first vehicle path history data (the clear circles in FIG. 6) indicative of a travel path of a first vehicle V#1 (FIG. 6) that has traveled along a vehicle lane. The first vehicle V#1 will use this first vehicle path history data and its map information in determining its position on the road and the centerline of the lane if no other vehicle path history data is available. As seen in FIG. 6, the breadcrumbs (the clear circles in FIG. 6) of the vehicles are not always on the centerline indicated by the dashed and dotted line.

Immediately after the vehicle on-board unit 12 has been activated, the two-way wireless communication system 21 starts listening for incoming messages. In particular, the control unit 20 processes the incoming messages received by the two-way wireless communication system 21 from other vehicles 10 and the roadside units 16 that are within the communication area. In step S2, the control unit 20 determines if any of the incoming messages are relevant to the lane that the host vehicle is traveling. In other words, the control unit 20 selects the incoming messages from preceding vehicles that are traveling ahead of the host vehicle and that are traveling in the same lane as the host vehicle. Thus, the host vehicle receives the vehicle path history data from one or more preceding vehicles that previously traveled the same vehicle lane the host vehicle is currently traveling.

In the event that one of the incoming messages is relevant, i.e., contains a relevant path history message, then the control unit 20 recalculates the lane centerline of the host vehicle 10 with the cumulative lane centerline data of the path history message from the incoming messages (step S3). In other words, the host vehicle now uses it own vehicle path history data that is indicative of a travel path of the host vehicle along the vehicle lane and the prior vehicle path history data that is indicative of a travel path of one or more preceding vehicles that have traveled along the vehicle lane in determining an amended centerline of the lane. Preferably, in step S3, the lane centerline determining component of the control unit is configured to weight the preceding vehicle path history data more heavily than the host vehicle path history data in determining the centerline of the lane. In other words, the lane centerline determining component is further configured to increase a weight given to the preceding vehicle path history data in determining the centerline of the lane as the statistical information includes more vehicle path histories as discussed above.

As seen in FIG. 6, the second vehicle V#2 receives the vehicle path history from the first vehicle #1 and calculates the center lane offsets by the black circles in FIG. 6. Preferably, in updating the vehicle path history to determine an amended centerline of the lane, the control unit 20 of the host vehicle is configured to more heavily weighting preceding vehicle path history data than its own vehicle path history data in determining the centerline of the lane as discussed above.

Next, in step S4, the two-way wireless communication system 21 of the host vehicle broadcast its common message set with its amended path history message and other vehicle parameters as mentioned above. When the process has proceeded directly from step S3 to step S4, then the amended path history message is an amended cumulative vehicle path history.

In step S2, if there are no incoming messages that are relevant to the calculation of the lane centerline of the lane that the host vehicle is traveling, then the process proceeds to step S4 where the control unit 20 of the host vehicle 10 broadcast its common message set with its recalculated path history message based on the current information that its available. In other words, regardless of the relevancy of the incoming message, the host vehicle would calculate the lane centerline and broadcast the Common Message Set with its known lane centerline information. In this way, the host vehicle periodically broadcasts its path history message based on its own path history and/or in conjunction with other preceding vehicles path history.

Turning now to the anti-tailgating feature of the present invention. Here, the control unit 20 is configured to activate the brake lights 38 of the host vehicle without performing a braking operation in the host vehicle when the control unit 20 determines that the current traveling conditions are such that the following vehicle is traveling too close to the host vehicle. More specifically, the vehicle traveling condition detecting section of the control unit 20 is preferably configured to detect one or more factors that affect the appropriate following distance. In the illustrated embodiment, the vehicle traveling condition detecting section of the control unit 20 preferably detects a host vehicle location (local road, highway, school zone, etc.) using the global positioning system 23 together with map information received from the map database and storage section or the external server 18 as part of the vehicle traveling conditions that are indicative of the potentially inadequate safety zone existing between the host vehicle and the following vehicle. Also in the illustrated embodiment, the vehicle traveling condition detecting section of the control unit 20 preferably detects a host vehicle speed as part of the vehicle traveling conditions that are indicative of the potentially inadequate safety zone existing using a vehicle speed sensor (one of the in-vehicle sensors shown in FIG. 2). Further in the illustrated embodiment, the vehicle traveling condition detecting section of the control unit 20 preferably detects a following distance between the host vehicle and a following vehicle as part of the vehicle traveling conditions that are indicative of the potentially inadequate safety zone existing using a laser range finder, a camera or information from the incoming common message set from the following vehicle. In addition, the vehicle traveling condition detecting section of the control unit 20 can also detect a relative speed between the host vehicle and the following vehicle as part of the vehicle traveling condition that is indicative of the potentially inadequate safety zone using a laser range finder, a camera or information from the incoming common message set from the following vehicle. Moreover, the vehicle traveling condition detecting section of the control unit 20 can also detect an amount of throttle release in the host vehicle as part of the vehicle traveling condition that is indicative of the potentially inadequate safety zone existing using the throttle valve opening sensor 34. The vehicle traveling condition detecting section can also be configured to detect driving characteristics of the host vehicle over a prescribed period of time as part of the vehicle traveling condition that is indicative of the potentially inadequate safety zone existing using the in vehicle sensors shown in FIG. 2 to develop the driving characteristics of the host vehicle. Each of these traveling conditions as well as other traveling conditions (not mentioned) affecting a safe following distance can be used individually or in any combination to develop a prescribed trigger or set point for outputting a brake light activation signal. Also as explained below, when one or more of these traveling conditions are used together to develop a prescribed trigger or set point, the prescribed trigger or set point can change as one of the traveling conditions changes. In other words, these traveling conditions are interdependent such that as one condition changes, another condition may need to be adjusted in order to attempt to obtain appropriate safety zone or following distance.

Based on one or more of these traveling conditions (e.g., the host vehicle location, the host vehicle speed, the following distance of the following vehicle, the relative speed between the vehicles, the throttle release amount and/or the host vehicle driving characteristics), the automatic brake light triggering section of the control unit 20 determines whether or not selected prescribed vehicle traveling conditions exist that are indicative of a potentially inadequate safety zone existing between the host vehicle and the following vehicle. The automatic brake light triggering section of the control unit 20 can also optionally adjust the trigger or point for determining when to output the brake light activation signal depending on such factors affecting the appropriate following distance such as the host vehicle location, the host vehicle speed, the following distance of the following vehicle, the relative speed between the vehicles, the throttle release amount and/or the host vehicle driving characteristics. Stated differently, the automatic brake light triggering section adjusts the predetermined triggering conditions that must be met in order to determine when to output the brake light activation signal as the traveling conditions change. For example, as the host vehicle speed increases, the following distance of the following vehicle should increase. Thus, as the host vehicle speed increases, the trigger or set point of the automatic brake light triggering section of the control unit 20 is set to activate the brake lights 38 sooner, i.e., the acceptable following distance of the following vehicle is increased. This could be accomplished by using a prestored control map plotting in the trigger point which the following distance is set on one axis of the control map and the vehicle speed is set on the other axis of the control map.

In the case of the throttle release amount, the automatic brake light triggering section can use a rate of change in the amount of throttle release between two throttle positions as part of the predetermined condition used to determine when to output the brake light activation signal. The trigger or set point for outputting a brake light activation signal based on the throttle release amount in the host vehicle is preferably adjusted depending on one or more of the traveling conditions (e.g., the host vehicle location, the host vehicle speed, the following distance of the following vehicle, the relative speed between the vehicles and/or the host vehicle driving characteristics). Alternatively, the automatic brake light triggering section uses a drop in an amount of throttle release to a closed throttle position within a prescribed period of time as part of the predetermined condition used to determine when to output the brake light activation signal. Again the trigger or set point for outputting a brake light activation signal can be depending on one or more of the traveling conditions. Of course, the trigger or set point could be a fixed prescribed throttle release amount that not adjusted when the other traveling conditions are changed if needed and/or desired.

In any event, upon the vehicle traveling condition detecting section of the control unit 20 determining a predetermined condition has been satisfied based upon the vehicle traveling conditions that were detected, the automatic brake light triggering section of the control unit 20 outputs a brake light activation signal to the brake light activating section of the control unit 20. When the brake light activation signal from the automatic brake light triggering section of the control unit 20 is received by the brake light activating section of the control unit 20, then the brake light activating section of the control unit 20 activates the brake lights 38 so that that flash at the following vehicle. The brake lights 38 will continue to be flashed at the following vehicle until the potentially inadequate safety zone occurring in a host vehicle ceases to exist. The brake light activating section of the control unit 20 activates the brake lights 38 of the host vehicle without a braking operation being performed in the host vehicle upon receiving the brake light activation signal from automatic brake light triggering section of the control unit 20.

Figure 7:
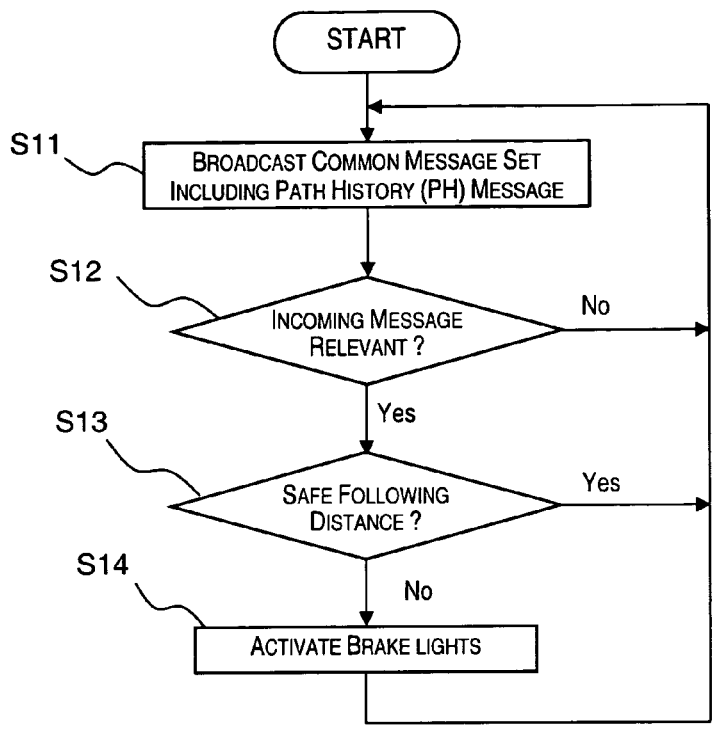
FIG. 7 is a flowchart illustrating a flow of control executed in the on-board unit in performing an anti-tailgating method to activate brake lights in the host vehicle upon determining a vehicle traveling condition exists that is indicative of a potentially inadequate safety zone between the host vehicle and a following vehicle in accordance with the present invention.

Referring now to a flowchart of FIG. 7, a simplified flow chart is illustrated to explain the basic functions that are performed in the vehicle on-board unit 12 when conducting the anti-tailgating method to activate brake lights 38 in the host vehicle upon determining a vehicle traveling condition exists that is indicative of a potentially inadequate safety zone between the host vehicle and a following vehicle. Of course, it will be apparent to those skilled in the art from this disclosure that other options, can be provided in addition to the ones described and illustrated in the embodiment that is being used to illustrate the basic functions of the present invention.

As mentioned above, immediately after the vehicle on-board unit 12 has been activated, the two-way wireless communication system 21 starts listening for incoming messages from other vehicles 10 and the roadside units 16 that are within the communication area. Also immediately after the vehicle on-board unit 12 has been activated, in step S11, the two-way wireless communication system 21 starts broadcasting its common message set with its path history message and other vehicle parameters as mentioned above.

Next in step S12, the control unit 20 processes the incoming messages received by the two-way wireless communication system 21 from other vehicles 10 and/or the roadside units 16 that are within the communication area. In other words, in step S12, the control unit 20 determines if any of the incoming messages are relevant to the lane that the host vehicle is traveling and if any of the incoming messages are from a following vehicle. If one of the incoming messages is from a following vehicle that is in the same lane as the host vehicle, then that incoming message is relevant to the anti-tailgating feature of the present invention.

Next the process proceeds to step S13, where the control unit 20 determines if a safe following distance exists between the host vehicle and the following vehicle. This determination is performed based on one or more vehicle traveling conditions of the host vehicle and/or one or more vehicle traveling conditions of the following vehicle. In other words, the control unit 20 determines whether a vehicle traveling condition exists that is indicative of a potentially inadequate safety zone occurring in the host vehicle equipped with the vehicle on-board unit 12. Thus, the control unit 20 determines if the following vehicle is too close to the host vehicle by considering the current traveling conditions of the host vehicle and/or the following vehicle as mentioned above.

If the control unit 20 determines that a safe following distance exists, then the process proceeds back to step S11, where the cycle will be repeated. However, if the control unit 20 determines that a safe following distance does not exist, then the process proceeds to step S14 where the control unit 20 actives the brake lights 38. In other words, the control unit 20 determines that the following vehicle is too close and the brake lights 38 will flash to move the following vehicle off the tail end of the host vehicle.

Turning now to the potential braking alert feature of the present invention. Here, the control unit 20 is configured to alert the driver of the host vehicle when the control unit 20 determines that the current traveling conditions are such that a potential braking situation exists in a preceding vehicle is traveling in the same lane as the host vehicle. More specifically, in the potential braking alert feature, the incoming message receiving section of the control unit 20 receive a preceding vehicle common message set containing throttle release data of a preceding vehicle located in front of the host vehicle. The incoming message relevancy section of the control unit 20 performs a relevancy determination of the throttle release data received by the incoming message receiving section of the control unit 20. The driver warning section of the control unit 20 then selectively alert a driver of the host vehicle of a potential braking situation of the preceding vehicle based upon the relevancy determination of the incoming message relevancy section of the control unit 20. For example, the incoming message relevancy section of the control unit 20 can perform the relevancy determination of the throttle release data either based on an amount of throttle release, or based on a rate of change in the amount of throttle release between two throttle positions. Alternatively, the incoming message relevancy section of the control unit 20 can perform the relevancy determination of the throttle release data based on a drop in the amount of throttle release to a closed throttle position within a prescribed period of time.

Figure 4:
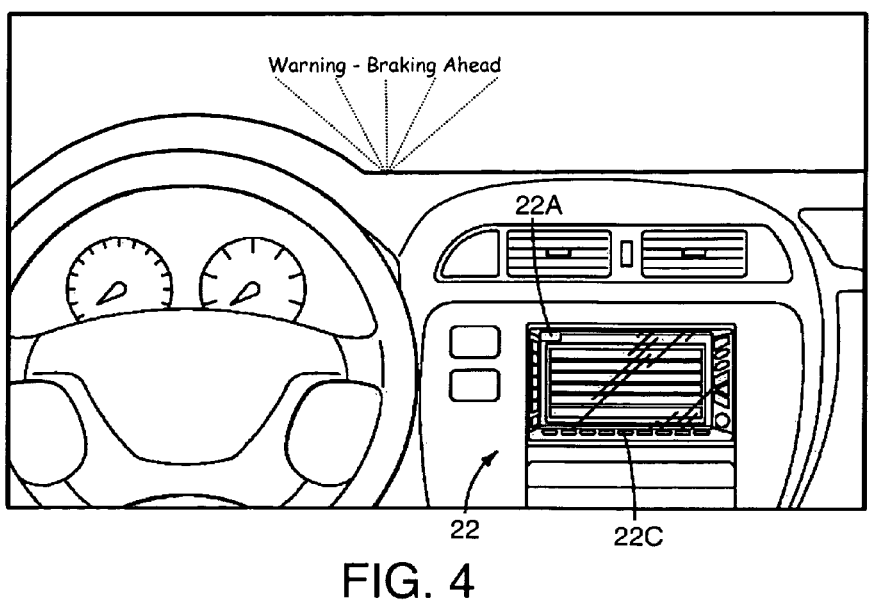
FIG. 4 is an inside elevational view of a portion of the vehicle's interior that is equipped with the on-board unit for conducting two-way wireless communications in the vehicle navigation system in accordance with the present invention.

Preferably, the driver warning section of the control unit 20 is further configured to produce a first warning signal to alert the driver of the potential braking situation based upon the relevancy determination satisfying a first condition indicative of a slow throttle releasing action in the preceding vehicle, and to produce a second warning signal to alert the driver of the potential braking situation based upon the relevancy determination satisfying a second condition indicative of a fast throttle releasing action in the preceding vehicle with the first and second warning signals being different. In the illustrated embodiment, the driver warning section of the control unit 20 is further configured to produce a first visual signal using the visual warning indictor 26 to project a yellow brake warning signal on the windshield (see FIG. 4) of the vehicle as part of the first warning signal. Moreover, in the illustrated embodiment, the driver warning section of the control unit 20 is further configured to produce a second visual signal using the visual warning indictor 26 to project a red brake warning signal on the windshield (see FIG. 4) of the vehicle as part of the second warning signal. Of course, other visual indicators could be used such as a bar graph. Also, in the illustrated embodiment, the driver warning section of the control unit 20 is further configured to produce an audible signal using the audio speaker 22B as part of the second warning signal in addition to the second visual signal produced by the visual warning indictor 26. Alternatively, a haptic warning signal can be used in addition to or instead of the first and second visual warnings to alert the driver of the potential braking situation. For example, the steering vibrating device 28 can vibrate the steering wheel of the steering structure 26 when the control unit 20 determines that it is desirable to warn the driver of a safety concern such as a potential braking situation occurring in the preceding vehicle as part of either the first or second warning signals. In other words, any combination of visual warnings, auditory warnings and haptic warnings can be to produce two or more distinct warnings to alert the driver of the level of the potential braking situation. Preferably, as the potential braking situation increases in risk, the stimuli to the driver increase. Thus, for example, a low warning level could only use a visual warning, a medium warning level could use both visual and auditory warnings, and a high warning level could use visual, auditory and haptic warnings.

Preferably, the potential braking alert feature of the present invention also uses the vehicle traveling condition detecting section to detect a vehicle traveling condition relating to a potential braking situation occurring in the preceding vehicle. More specifically, the vehicle traveling condition detecting section of the control unit 20 is further preferably configured to detect one or more factors that affect the potential risk of a braking situation occurring in the preceding vehicle. In the illustrated embodiment, as mentioned above, the vehicle traveling condition detecting section of the control unit 20 preferably detects among other things, the host vehicle location (local road, highway, school zone, etc.) the host vehicle speed, an amount of throttle release in the host vehicle, and driving characteristics of the host vehicle over a prescribed period of time. Moreover, the vehicle traveling condition detecting section of the control unit 20 also preferably detects a host following distance between the host vehicle and a preceding vehicle using a laser range finder, a camera or information from the incoming common message set from the preceding vehicle, and a relative speed between the host vehicle and the preceding vehicle using a laser range finder, a camera or information from the incoming common message set from the preceding vehicle. Each of these traveling conditions as well as other traveling conditions (not mentioned) affecting a safe following distance can be used individually or in any combination to develop a prescribed trigger or set point for outputting a producing warning signals. Also as explained below, when one or more of these traveling conditions are used together to develop a prescribed trigger or set point, the prescribed trigger or set point can change as one of the traveling conditions changes. In other words, these traveling conditions are interdependent such that as one condition changes, another condition may need to be adjusted in order to warn the driver of a potential braking situation existing that is relevant to the host vehicle. For example, the vehicle traveling condition detecting section detects a following distance between the host vehicle and the preceding vehicle as part of the vehicle traveling condition as well as a host vehicle speed as part of the vehicle traveling condition. The vehicle traveling condition detecting component can further detect a relative speed between the host vehicle and the preceding vehicle as part of the vehicle traveling condition.

Figure 8:
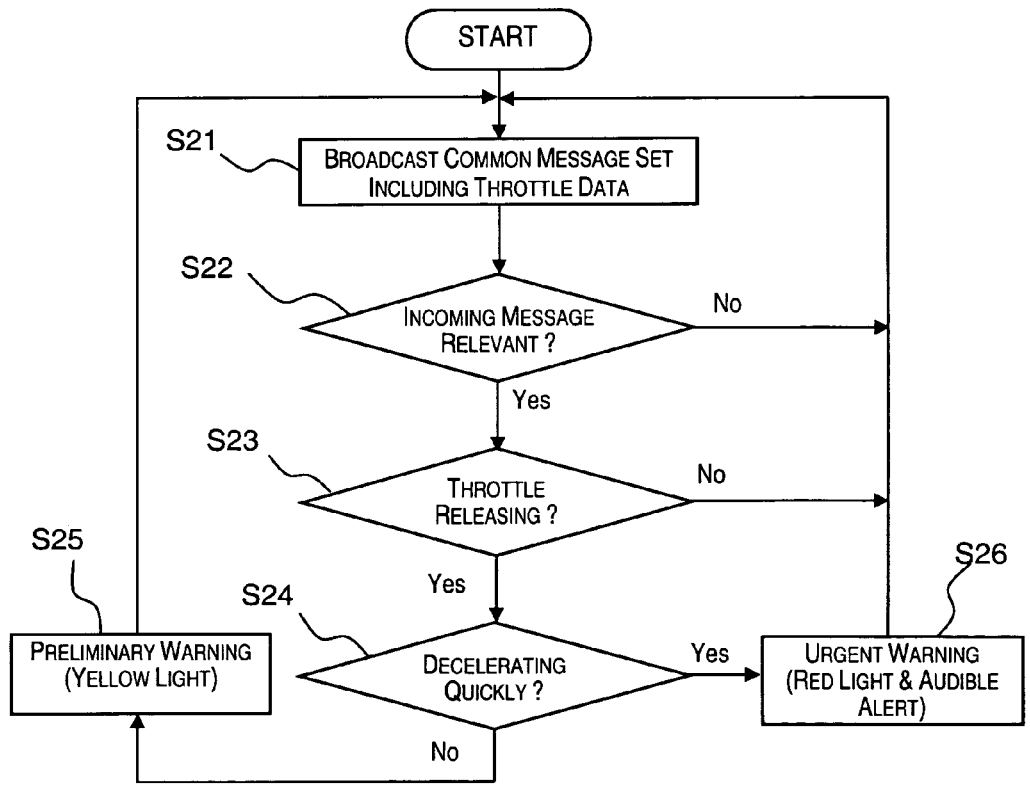
FIG. 8 is a flowchart illustrating a flow of control executed in the on-board unit in performing a potential braking situation alert method to alert the driver of a potential braking situation in a preceding vehicle in accordance with the present invention.

Referring now to a flowchart of FIG. 8, a simplified flow chart is illustrated to explain the basic functions that are performed in the vehicle on-board unit 12 when conducting the potential braking situation alert method to alert the driver of a potential braking situation in a preceding vehicle. Of course, it will be apparent to those skilled in the art from this disclosure that other options, can be provided in addition to the ones described and illustrated in the embodiment that is being used to illustrate the basic functions of the present invention.

As mentioned above, immediately after the vehicle on-board unit 12 has been activated, the two-way wireless communication system 21 starts listening for incoming messages from other vehicles 10 and the roadside units 16 that are within the communication area. Also immediately after the vehicle on-board unit 12 has been activated, in step S21, the two-way wireless communication system 21 starts broadcasting its common message set with its path history message and other vehicle parameters as mentioned above.

Next in step S22, the control unit 20 processes the incoming messages received by the two-way wireless communication system 21 from other vehicles 10 and/or the roadside units 16 that are within the communication area. In other words, in step S22, the control unit 20 determines if any of the incoming messages are relevant to the lane that the host vehicle is traveling and if any of the incoming messages are from a preceding vehicle. If one of the incoming messages is from a preceding vehicle that is in the same lane as the host vehicle, then that incoming message is relevant to the potential braking alert feature of the present invention.

Next the process proceeds to step S33, where the control unit 20 determines if the incoming message of the preceding vehicle contains throttle releasing data (accelerator pedal releasing or throttle valve opening closing) is indicative of a potential braking situation in the preceding vehicle. If the control unit 20 determines the incoming message of the preceding vehicle does not contains throttle releasing data indicating the accelerator pedal is being released or the throttle valve opening is closing, then the process returns back to step S21, where the two-way wireless communication system 21 continues to broadcast its common message set with its path history message and other vehicle parameters as mentioned above. However, if the control unit 20 determines the incoming message of the preceding vehicle contains throttle releasing data indicating the accelerator pedal is being released or the throttle valve opening is closing, then the process to step S24, where the throttle releasing data is further analyzed.

In step S24, the control unit 20 determines the degree (high or low) of risk of an actual braking situation might occur. In particular, the control unit 20 determines whether the throttle releasing data indicates that the accelerator pedal is being released quickly or the throttle valve opening is closing quickly or closed. In other words, if the preceding vehicle is releasing its accelerator pedal or the throttle valve opening is closing, then the control unit 20 compares the throttle releasing data to prescribed parameters to determine if there is high likelihood of an actual braking situation will occur in the preceding vehicle. This determination is performed based on one or more vehicle traveling conditions of the host vehicle and/or one or more vehicle traveling conditions of the following vehicle. If the control unit 20 determines the throttle releasing data of incoming message from the preceding vehicle does not indicate the accelerator pedal is being released quickly or the throttle valve opening is closing quickly or closed, then the process to step S25, where a preliminary warning is given to the driver. This preliminary warning can be provided in a variety of ways, e.g., a yellow barking warning can be displayed on the vehicle's windshield via the warning indicator, the steering wheel could be vibrated, and/or an audible signal could be produced. However, if the control unit 20 determines the throttle releasing data of incoming message from the preceding vehicle indicates the accelerator pedal is being released quickly or the throttle valve opening is closing quickly or closed, then the process to step S26, where an urgent warning is given to the driver. This preliminary warning can be provided in a variety of ways, e.g., a red barking warning can be displayed on the vehicle's windshield via the warning indicator, the steering wheel could be vibrated, and/or an audible signal could be produced.

After the warning is produced in steps S25 and S26, the control process proceeds back to step S21, where the two-way wireless communication system 21 continues to broadcast its common message set with its path history message and other vehicle parameters as mentioned above. Thus, the process is repeated. Since the incoming messages are coming in rapidly, and then entire process is also completed very quickly, the warning (if given) will seem continuous to the driver between two incoming messages that require the same warning. While the illustrated embodiment only shows two warning levels (i.e., yellow and red), it will be apparent to those skilled in the art from this disclosure that several (three or more) warning levels can be provided if needed and/or desired.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle on-board unit comprising:
   a vehicle traveling condition detecting section configured to detect at least one vehicle traveling condition of a host vehicle that is equipped with the vehicle on-board unit, with the vehicle traveling condition detecting section monitoring a host vehicle location as part of the vehicle traveling condition to determine a travel lane of the host vehicle using a plurality of detection results of the host vehicle location;
   an incoming message receiving section configured to receive a preceding vehicle message containing throttle release data of a preceding vehicle located in front of the host vehicle equipped with the vehicle on-board unit;
   an incoming message relevancy section configured to perform a relevancy determination of the throttle release data received by the incoming message receiving section;
   a driver warning section configured to selectively alert a driver of the host vehicle of a potential braking situation of the preceding vehicle based upon the relevancy determination of the incoming message relevancy section; and
   a relevancy adjustment section configured to selectively adjust the relevancy determination of the throttle release data when the driver warning section alerts the driver of the host vehicle of the potential braking situation of the preceding vehicle based on the travel lane.

2. The vehicle on-board unit as recited in claim 1, wherein the driver warning section is further configured to produce a first warning signal to alert the driver of the potential braking situation based upon the relevancy determination satisfying a first condition indicative of a slow throttle releasing action in the preceding vehicle, and to produce a second warning signal to alert the driver of the potential braking situation based upon the relevancy determination satisfying a second condition indicative of a fast throttle releasing action in the preceding vehicle with the first and second warning signals being different.

3. The vehicle on-board unit as recited in claim 1, wherein the driver warning section is further configured to produce at least one of a visual warning signal, an audible warning signal and a haptic warning signal to alert the driver of the potential braking situation of the preceding vehicle.

4. The vehicle on-board unit as recited in claim 3, wherein the driver warning section is further configured to produce a first visual signal as part of the first warning signal and a second visual signal as part of the second warning signal.

5. The vehicle on-board unit as recited in claim 4, wherein the driver warning section is further configured to produce an audible signal as part of the second warning signal in addition to the second visual signal.

6. The vehicle on-board unit as recited in claim 1, wherein the vehicle traveling condition detecting section is further configured to detect a following distance between the host vehicle and the preceding vehicle as part of the vehicle traveling condition.

7. The vehicle on-board unit as recited in claim 1, wherein the vehicle traveling condition detecting section is further configured to detect a host vehicle speed as part of the vehicle traveling condition.

8. The vehicle on-board unit as recited in claim 1, wherein the vehicle traveling condition detecting section is further configured to detect a relative speed between the host vehicle and the preceding vehicle as part of the vehicle traveling condition.

9. The vehicle on-board unit as recited in claim 1, wherein the incoming message relevancy section is further configured to perform the relevancy determination of the throttle release data based on an amount of throttle release.

10. The vehicle on-board unit as recited in claim 9, wherein the incoming message relevancy section is further configured to perform the relevancy determination of the throttle release data based on a rate of change in the amount of throttle release between two throttle positions.

11. The vehicle on-board unit as recited in claim 9, wherein the incoming message relevancy section is further configured to perform the relevancy determination of the throttle release data based on a drop in the amount of throttle release to a closed throttle position within a prescribed period of time.

12. The vehicle on-board unit as recited in claim 1, further comprising
a vehicle path history generating section that generates a host vehicle path history data indicative of a travel path of the host vehicle.

13. The vehicle on-board unit as recited in claim 12, wherein
the vehicle path history generating section includes using GPS data of the host vehicle to generate the host vehicle path history comprising a plurality of GPS points.

14. The vehicle on-board unit as recited in claim 12, further comprising
a two-way wireless communications section configured to receive a preceding vehicle message that at least includes a preceding vehicle path history data indicative of a travel path of the preceding vehicle along the travel lane that the host vehicle is currently traveling; and
a lane centerline determining section configured to determine a lane centerline of the travel lane that the host vehicle is currently traveling based on the host vehicle path history data and the preceding vehicle path history data.

15. The vehicle on-board unit as recited in claim 14, wherein
the two-way wireless communications section is further configured to broadcast a host vehicle message that at least includes the host vehicle path history data and the preceding vehicle path history data.

16. The vehicle on-board unit as recited in claim 14, wherein
the lane centerline determining section is further configured to weight the preceding vehicle path history data more heavily than the host vehicle path history data in determining the centerline of the lane.

17. A method for early warning to a host vehicle driver of potential braking situation of a preceding vehicle comprising:
detecting a host vehicle traveling condition of a host vehicle, the detecting of the host vehicle traveling condition at least including monitoring a host vehicle location as part of the vehicle traveling condition to determine a travel lane of the host vehicle using a plurality of detection results of the host vehicle location;
receiving a preceding vehicle message containing throttle release data of the preceding vehicle located in front of a host vehicle;
performing a relevancy determination of the throttle release data that was received by the host vehicle at least partially based on the travel lane of the host vehicle that was determined; and
selectively warning the driver of the host vehicle of a potential braking situation of the preceding vehicle based upon the relevancy determination of the throttle release data.

18. The method as recited in claim 17, wherein
the warning to the driver of the host vehicle includes producing a first warning signal to alert the driver of the potential braking situation based upon the relevancy determination satisfying a first condition indicative of a slow throttle releasing action in the preceding vehicle, and to produce a second warning signal to alert the driver of the potential braking situation based upon the relevancy determination satisfying a second condition indicative of a fast throttle releasing action in the preceding vehicle with the first and second warning signals being different.

19. The method as recited in claim 17, further comprising
selectively changing a timing of the warning to the driver based on the vehicle traveling condition.

\* \* \* \* \*